United States Patent

Ries

[11] Patent Number: 5,952,614
[45] Date of Patent: Sep. 14, 1999

[54] A.C. CABLE WITH STRANDED ELECTRICAL CONDUCTORS

[75] Inventor: Günter Ries, Erlangen, Germany

[73] Assignee: Siemens AG, Munich, Germany

[21] Appl. No.: 08/973,390

[22] PCT Filed: May 22, 1996

[86] PCT No.: PCT/DE96/00896

§ 371 Date: Mar. 4, 1998

§ 102(e) Date: Mar. 4, 1998

[87] PCT Pub. No.: WO96/39705

PCT Pub. Date: Dec. 12, 1996

[30] Foreign Application Priority Data

Jun. 6, 1995 [DE] Germany .................. 195 20 589

[51] Int. Cl.[6] .................................................. H01B 9/02
[52] U.S. Cl. ................... 174/106 R; 174/125.1; 174/128.1; 333/243
[58] Field of Search ................ 174/128.1, 126.4, 174/125.1, 28, 108, 106 R; 333/243, 244, 245, 246

[56] References Cited

U.S. PATENT DOCUMENTS

| | | | |
|---|---|---|---|
| 3,163,836 | 12/1964 | Sugi et al. | 333/243 |
| 4,626,810 | 12/1986 | Nixon | 333/243 |
| 5,061,823 | 10/1991 | Carroll | 174/106 R X |

FOREIGN PATENT DOCUMENTS

| | | |
|---|---|---|
| 623 937 | 11/1994 | European Pat. Off. . |
| 644601 | 3/1995 | European Pat. Off. . |
| 1 555 807 | 1/1969 | France . |
| 181461 | 12/1903 | Germany . |
| 1 814 036 | 9/1969 | Germany . |
| 38 11 051 | 10/1989 | Germany . |
| 6-325629 | 11/1994 | Japan . |
| 9-106714 | 4/1997 | Japan . |
| 1371818 | 10/1974 | United Kingdom . |

Primary Examiner—Kristine Kincaid
Assistant Examiner—Chau N. Nguyen
Attorney, Agent, or Firm—Kenyon & Kenyon

[57] ABSTRACT

An a.c. cable has at least one cable core (2) with a central carrier body (4), having at least three conductor layers ($L_j$) of normal conductors or superconductors (3) stranded around it. The conductors preferably have high-$T_c$ superconducting material. The wire angles ($\alpha_j$) in the individual conductor layers ($L_j$) are selected so that viewed in the radial direction they gradually increase or decrease from layer to layer. The cable core can advantageously have a concentric arrangement of a forward and a return conductor.

13 Claims, 4 Drawing Sheets

A.C. CABLE WITH STRANDED ELECTRICAL CONDUCTORS

FIELD OF THE INVENTION

The present invention relates to an a.c. cable with at least one cable core having a central carrier body and at least three conductor layers formed by electric conductors arranged filament-like around the carrier body at a predefined wire angle.

BACKGROUND INFORMATION

An a.c. cable, for example, is described in German Patent No. 38 11 051.

The development of a.c. cables with electric conductors containing superconducting metal oxide compounds as conducting materials is of particular interest today. Such superconducting metal oxide compounds with high critical temperatures $T_c$ of preferably over 77 K, which can therefore be cooled with liquid nitrogen at normal pressure, are generally known. These compounds are referred to as high-$T_c$ or high-temperature superconducting materials (abbreviated as HTSC materials). Suitable metal oxide compounds include in particular cuprates, for example, Y—Ba—Cu—O or (Bi,Pb)—Sr—Ca—Cu—O system-based cuprates.

Conductors allowing superconducting cable cores of a.c. cables to be built can be constructed from these HTSC materials for electric power transmission with low losses and small cross sections. Economic advantages are thus achieved in comparison with known normally conducting cables, since the a.c. field losses, including the energy consumed in a refrigeration system used to dissipate said losses, are lower than the losses in a comparable normally conducting cable.

Estimates and loss measurements on cable models lead to the expectation that this object cannot be easily achieved if cable cores with a plurality of layers of strip-shaped HTSC elementary conductors, for example, are required for the current-carrying capacity in question. It is considered that this is due to the movement, accompanied by losses, of the magnetic self-field flux into and out of the superconductor and induced eddy currents in metallic conductor components. According to a known, empirically supported loss theory, the magnetic field on the conductor surface should be selected to be as small as possible. This theory, however, applied to an a.c. cable, means that the diameter of the cable cores should be sufficiently large so that the current can be carried with a single layer of single superconductors. This, however, causes problems regarding

- low flexibility and large allowable radii during manufacturing, transportation, and storage,
- a high volume of electrical insulation, high dielectric losses, and high capacitance,
- large cryogenic shell surface and considerable influx of heat into the coolant.

No measures are currently known to eliminate these problems.

SUMMARY OF THE INVENTION

An object of the present invention is to provide an a.c. cable so that at least most of the aforementioned problems, in particular when using superconducting materials, do not occur. An a.c. cable according to the present invention should also be applicable to normally conducting cables.

This object is achieved according to this invention by selecting the wire angle of the conductors in the individual conductor layers so that they either gradually increase or gradually decrease from layer to layer between a first wire angle of the radially innermost conductor layer and a second wire angle of the radially outermost conductor layer.

According to the present invention, in a cable core, with a single layer of conductors stranded with a wire angle $\alpha$, current I follows spiral paths and has, in addition to an axial component $I_z = I \cos\alpha$ along the cable core axis (z direction), an azimuthal component $I_\psi = I \sin\alpha$ in the peripheral direction. Therefore, a single layer with specific current density J generates two magnetic field components:

in the external space around the conductor layer (with radius r>R), the field is purely azimuthal:

$H_\psi = J_z R/r = J \cos\alpha R/r$.

in the internal space enclosed by the conductor layer (with radius r<R), the field is homogeneous and is directed along the cable axis z:

$H_z = J_\psi = J \sin\alpha$, where $\alpha$ is the wire angle between the individual superconductors and the cable axis (in the z direction), R is the radius of the single conductor layer, $J = I/(2\pi R \cos\alpha)$ is the specific current density on the conductor surface (=the current in a strip-shaped single conductor per unit of strip width).

In such a single-layer cable core, the alternating field losses are caused by the field component of the outside surface $$H_\psi(R) = J_z = I/(2\pi R).$$

On the other hand, the overlapping of the absolute field values of the individual conductor layers must be taken into account for multilayer stranded cable cores. Again, the total field here has only one $\phi$ component on the outside and only one z component on the inside. Both field components are present, however, in the space between adjacent conductor layers.

It has now been recognized that at least most of the alternate field losses caused by these two field components in the intermediary space can be prevented with the multilayer cable core stranding design of the a.c. cable according to this invention, because it prevents the magnetic flux from drifting through the conductors from the outside into the intermediary space between the individual layers. This advantageously eliminates the relatively high losses associated with said phenomenon. These considerations apply both to superconducting conductors, in particular conductors containing HTSC materials, and to normally conducting conductors.

DETAILED DESCRIPTION OF THE INVENTION

Figure 1:
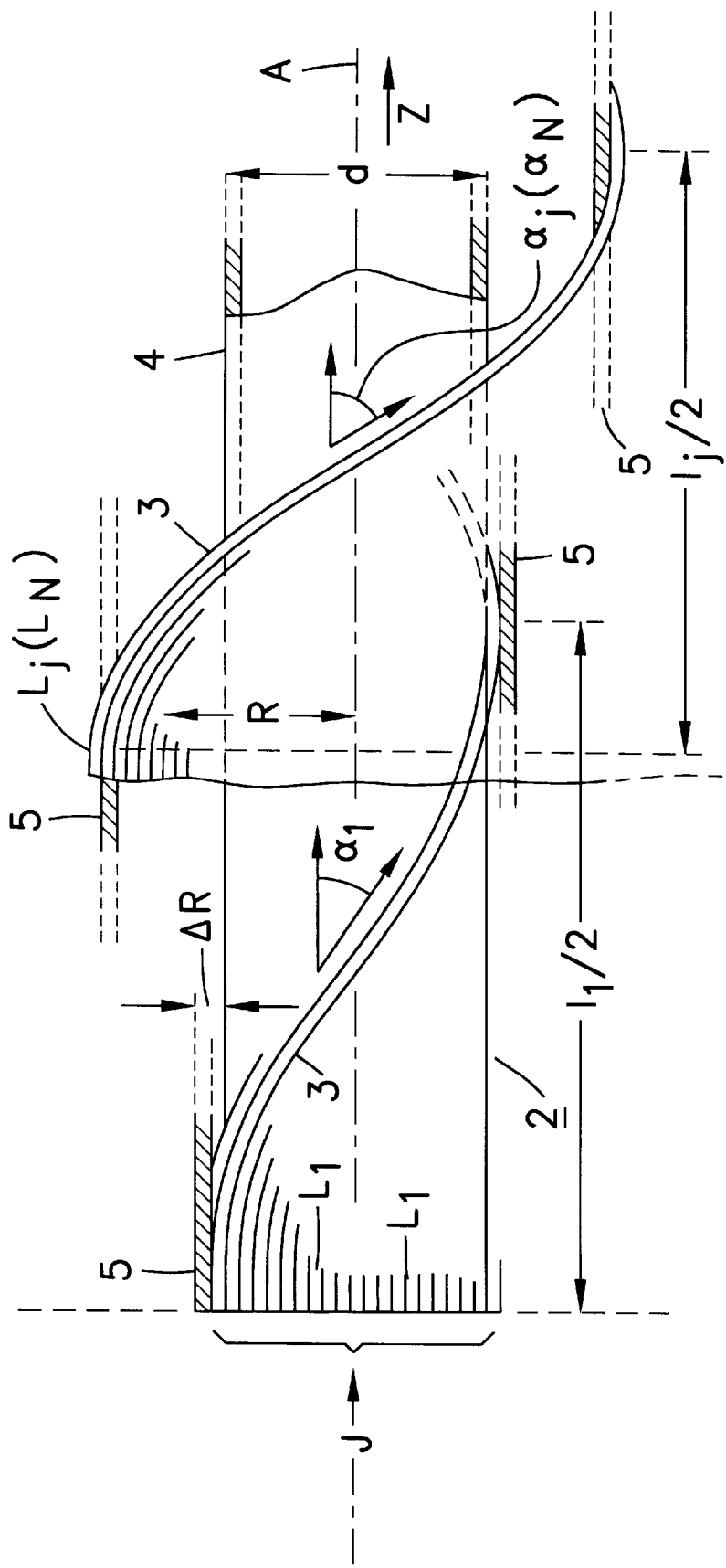
FIG. 1 shows a cross section of a strand including a single cable core according to the present invention.
Figure 2:
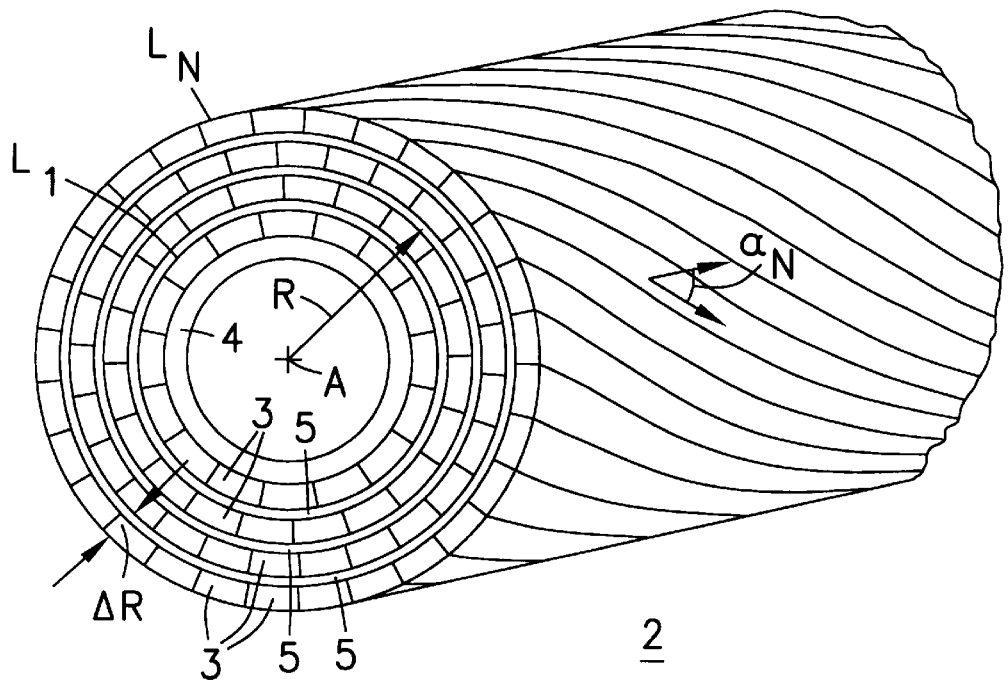
FIG. 2 shows another cross section and another oblique section of a strand including a single cable core.

FIGS. 1 and 2 show only one conductor core 2 of an a.c. cable according to the present invention with a first layer $L_1$ of individual, preferably immediately adjacent conductors 3 on a preferably solid or hollow cylindrical carrier body 4 enclosing a longitudinal axis A. Axis A points in the direction z of the coordinate system. A superconducting material with high critical temperature $T_c$ (in particular, over 77 K) is selected as the conducting material for this embodiment. The wire- or strip-shaped individual superconductors 3 contain an HTSC material such as $(Bi,Pb)_2Sr_2Ca_2Cu_3O_x$, which can be embedded in a normally conducting matrix, for example of Ag or an Ag alloy. The HTSC material can also be applied in the form of a layer onto a normally conducting carrier. The superconducting individual conductors can be configured as single-core conductors or multicore (multifilament) conductors having a round or preferably flat cross section. For example, an HTSC multifilament flat wire with at least 19 filaments having an approximately elliptical cross section can be provided in a silver matrix. An Ag-containing matrix material can also be alloyed with 0.1% to 4% bismuth, lead, antimony, aluminum or zinc, and exhibit a specific electric resistance of at least $10^{-6}$ Ω.cm at 77 K. Such a multicore conductor may have twisted conductor cores (filaments) with a twist length of between 1 and 10 cm. For strip-shaped superconductors the width to thickness ratio is preferably between 10:1 and 50:1.

In the radially innermost conductor layer $L_1$ made of a plurality of suitable superconducting single-core or multi-core conductors 3 running next to one another, these conductors should always be arranged with a predefined lay length $l_1$, in a helical or filament-like arrangement. Depending on the diameter d of carrier body 4 a predefined wire angle $\alpha_1$ is then obtained between the longitudinal direction of each superconductor 3 and the longitudinal direction (axial direction z) of carrier body 4.

At least two additional layers $L_j$ of superconducting individual conductors 3, which are only indicated in FIGS. 1 and 2, and which are preferably identical to those of layer $L_1$, are arranged around layer $L_1$. (Therefore the following applies to index j:$1 \leq j \leq N$ with $N \geq 3$.) A thin electric insulation 5 can be provided between adjacent conductor layers. A thin electrically conducting layer, however, can also be provided between said layers. The layer can be made of poorly conducting material, for example, carbon paper, with a surface resistance between $10^{-2}$ and $10^{-6}$ Ω.cm². According to the present invention, a predefined lay length $l_j$ and thus a wire angle $\alpha_j$, dependent on said length, is to be provided for the superconductors 3 of the additional layer $L_j$. The specific values for the lay lengths $l_1$ and $l_j$, as well as the wire angles $\alpha_1$ and $\alpha_j$, are selected according to this invention so that the current transported by the cable is distributed at least approximately evenly to all conductor layers $L_j$ (with $1 \leq j \leq N$). This means that in a conductor core 2 shown with N ($\geq 3$) layers $L_j$ of superconductors 3, each of these layers must have at least approximately the same specific current density $J_j=J$. Specific current density $J_j$ of the jth conductor layer $L_j$ is understood here as the total current referred to the circumference of the respective conductor layer $L_j$ and the cosine of the wire angle $\alpha_j$ of the conductor in this layer.

This means, $J_j=I_{ges}/(2\pi r_j * N * \cos\alpha_j)$ with $I_{ges}$=total current in the entire cable core, $r_j$=mean radius of the conductor layer $L_j$.

This is to be achieved according to the present invention by the fact that, considering the conductor layers in the radial direction, wire angle $\alpha_j$ changes stepwise from layer to layer without change in polarity of the angle change $\Delta\alpha_j=\alpha_{j+1}-\alpha_j$. This means that wire angle $\alpha_j$ always changes in one direction only from the innermost to the outermost layer. This is not the case in the known cable designs (see e.g., German Unexamined Published Patent Application No. 18 15 036 or European Patent 623 937 A). In the cable according to the present invention, $\alpha_j$ can preferably increase from a negative value $\alpha_1$ in a first layer to a positive value $\alpha_N$ in a last layer in steps $\Delta\alpha_j$ or decrease from a positive value $\alpha_1$ to a negative value $\alpha_n$. The angle change $\Delta\alpha_j$ between adjacent conductor layers $L_j$ and $L_{j+1}$ does not need to be always the same. The specific values for these values $l_j$ and $\alpha_j$ for the individual conductor layers $L_j$ can be determined experimentally in general.

In conductor core 2 indicated in FIGS. 1 and 2, with current flowing in one direction only e.g., (in the forward direction), it is particularly advantageous if the lay lengths $l_j$ and the wire angles $\alpha_j$ of the individual conductor layers $L_j$ at least approximately satisfy the following mathematical relation:

$$\frac{2\pi R}{l_{j+1}} - \frac{2\pi R}{l_j} = \tan\alpha_{j+1} - \tan\alpha_j = \frac{2\Delta R \sum_{k=1}^{j} \cos\alpha_k}{R \cdot (H_z/J)},$$

with $$H_z/J = \sum_{k=1}^{N} \sin\alpha_k.$$

where

R is the mean radius of the totality of all conductor layers $L_j$;

$H_z/J$ is the axial field Hz inside conductor arrangement 2 divided by the specific current density $J=J_j$;

$\Delta R$ is the radial distance between the individual conductor layers. This distance corresponds to the thickness of the individual conductors 3 plus the thickness of layer insulation 5 that may be present;

j is the index of the corresponding conductor layer $L_j$ (with $1 \leq j \leq N$);

N is the total number of all conductor layers in the conductor arrangement.

Since $H_z/J$ in the denominator of the above recursive formula already contains all the desired $\alpha_j$, the above equation can be solved iteratively. Thus, each predefined value $H_z/J$ (in the axial direction z) will contain a set of angles $\{\alpha_j\}$. It must be noted that, in cable cores of the a.c. cables according to the present invention with the current flowing in one direction only, for example, wire angles $\alpha_j$ either only increase or only decrease radially from the inside out from one layer to another.

Wire angle $\alpha_j$ for some embodiments of four- and six-layer cable cores are given in the following Table 1, where only one forward conductor is shown. The wire angles given are selected for the mechanical stability of the entire cable core assembly. Depending on the embodiment selected, small conductor layer wire angles, for example of the central conductor layer, mean large lay lengths, so that problems may occur with securing individual superconductors in manufacturing the cable cores. However, in a finished cable core, the outermost layer always has the shortest lay length and thus it will secure the conductor layers further inward.

TABLE 1

| $H_2/J$ | $\alpha_1$ | $\alpha_2$ | $\alpha_3$ | $\alpha_4$ | $\alpha_5$ | $\alpha_6$ |
|---|---|---|---|---|---|---|
| 0.1 | −23 | −13.5 | 8 | 35.6 | | |
| 0.2 | −10 | −5.3 | 6 | 22 | | |
| 0.3 | −17 | −14 | −6.7 | 4.4 | 19 | 35.5 |
| 0.6 | −5 | −3 | 0.7 | 6.4 | 14 | 23 |

For the values given in the table, it was assumed that $2\Delta R/R = 0.02$.

The exemplary embodiment of a cable illustrated in FIGS. 1 and 2 based on the fact that cable core 2 should conduct alternating current in only one direction of its axis A, so that it represents a forward conductor only, for example. Therefore, only one return conductor is required. In a.c. cables, in particular for three-phase power transmission, generally cable cores that are electrically and magnetically neutral to the outside are desirable. Therefore the current of each phase is conducted back through a concentric outside conductor. No field is present outside each cable core in this case. In a superconducting cable with forward and return conductors, such an arrangement is indispensable; otherwise stray fields of the phase conductors running in parallel would induce additional compensating currents between the individual conductors of the stranded cable. In that case, the unavoidable a.c. field components perpendicular to the superconducting individual conductors would cause unacceptably high losses. Furthermore, additional eddy current losses would occur in a cryogenic shell made of metallic material.

Figure 3:
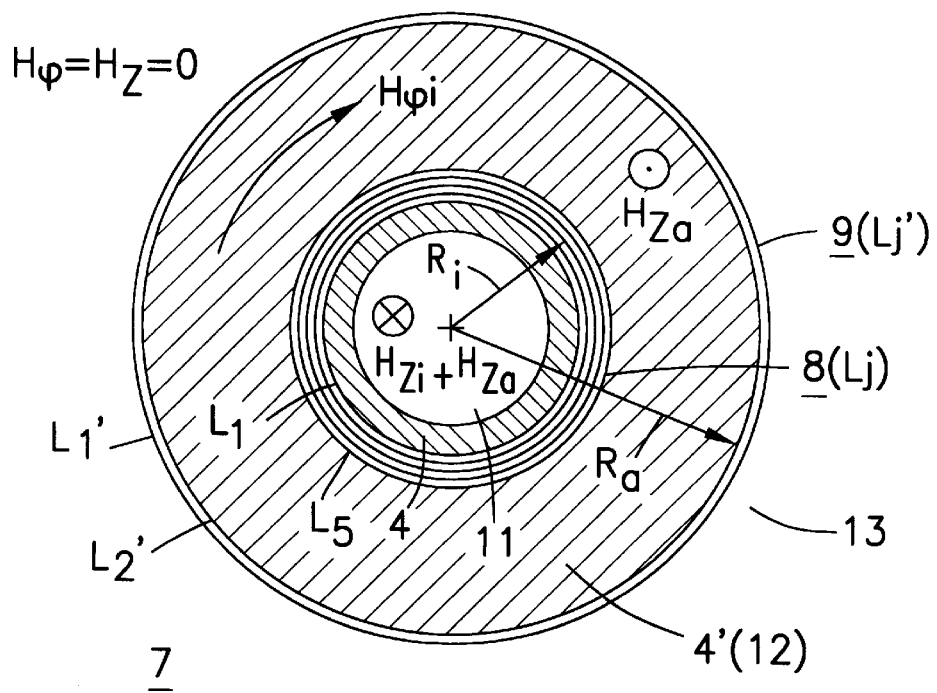
FIG. 3 shows a cross section of a cable with concentric forward and return conductors.

FIG. 3 schematically shows the cross section of such an a.c. cable core 7. It contains an internal conductor 8, with a mean radius $R_i$ of its winding of its conductor layers $L_j$ and an outside conductor 9 concentric to said internal conductor, with a mean radius $R_a$ of the winding of its conductor layers $L_j'$. The specific current density in the conductor layers of the external conductor arrangement should be opposite to that in the conductor layers of the internal conductor arrangement, i.e., should be equal to −J. Either internal conductor 7 or external conductor 9 or both conductors should have at least three conductor layers formed by individual electric conductors 3 wound filament-like around carrier bodies 4 and 4', which are only indicated in the figure. Then, for each of these conductors 7 and/or 9 with at least three conductor layers $L_j$ and $L_j'$, the formula according to this invention that wire angles α of the individual conductors in the individual conductor layers should be selected so that they either gradually increase or gradually decrease from layer to layer between a first wire angle of the radially innermost conductor layer and a second wire angle of the radially outermost conductor layer. In the embodiment of FIG. 3, only internal conductor 7 has at least three conductor layers, namely, five conductor layers $L_1$ through $L_5$, while external conductor 8 is formed by only two conductor layers $L_1'$ and $L_2'$; therefore the formula according to the present invention only applies to the internal conductor. This means that an a.c. cable according to the present invention can have an internal conductor with more than three conductor layers Lj and an external conductor with less than three conductor layers Lj', for example, two or only one conductor layer (or vice-versa). Conductor layers $L_j$ of the internal conductor are counted radially from the inside outward, while the conductor layers $L_j'$ of the external conductor arrangement are counted in the opposite direction. The overlapping axial fields $H_{zi} + H_{za}$ from the internal and external conductors are effective in the internal space 11 of the internal conductor; while only the axial field $H_{za}$ of the external conductor is effective in the intermediary space 12 between the internal and external conductor, filled with the material of carrier body 4', for example, where an azimuthal field $H_{\psi i}$ is also effective. The external space 13 is field-free ($H_{\psi}=H_z=0$)

Figure 4:
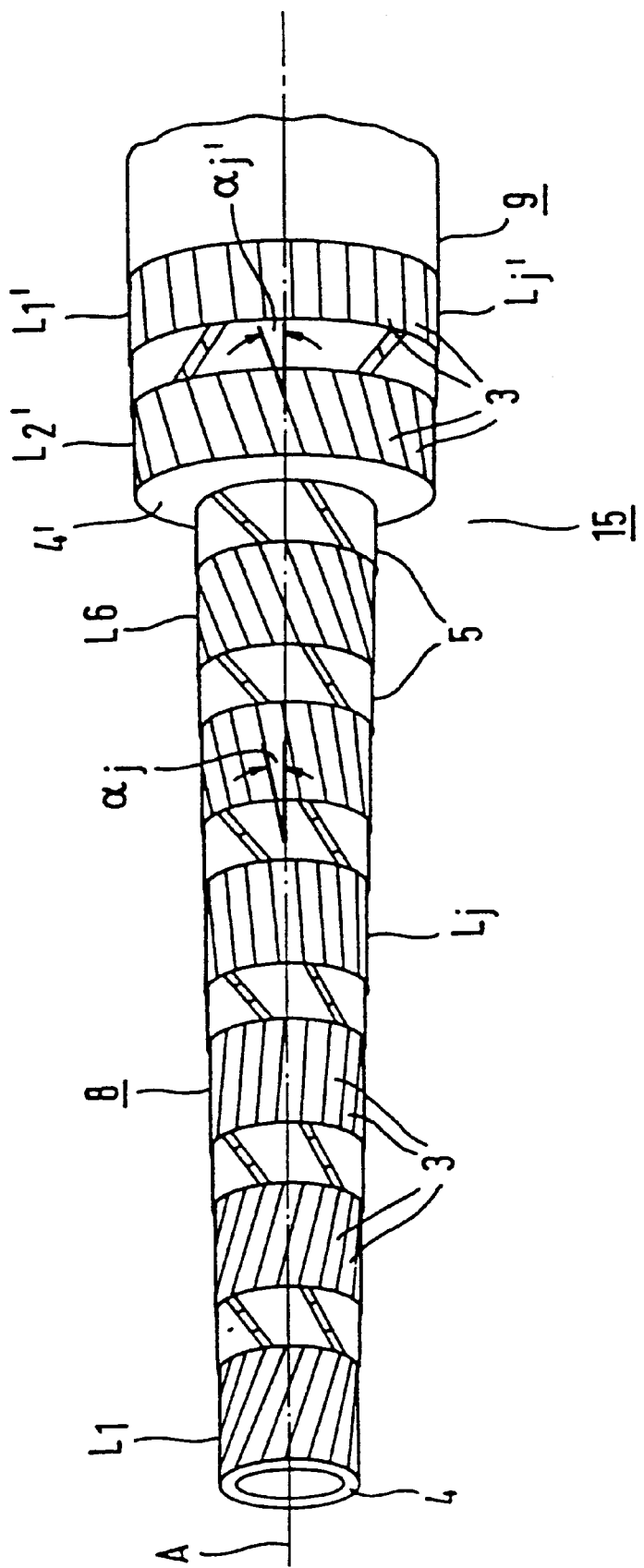
FIG. 4 shows an oblique section of the cable of FIG. 3.
Figure 5:
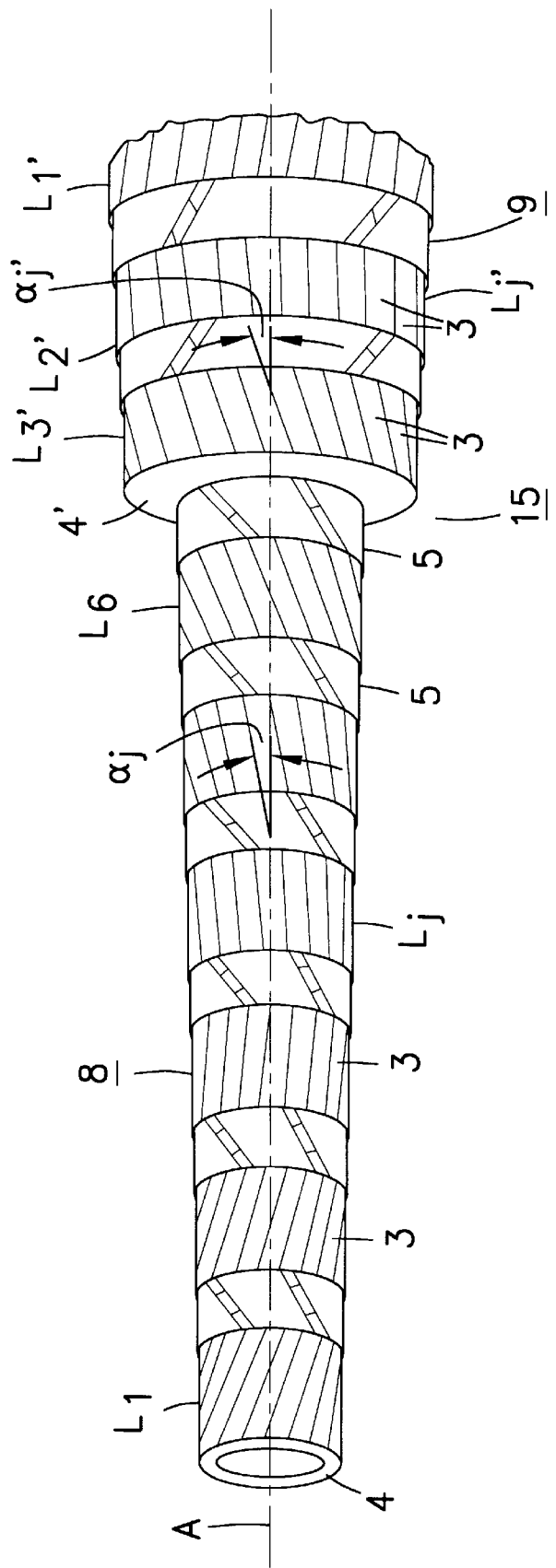
FIG. 5 shows exemplary embodiment of the cable.

FIG. 4 shows a suitably stranded cable core 15 of an a.c. cable according to the present invention with an internal conductor 8 and external conductor 9. The internal conductor has six conductor layers $L_j$ (j=1, . . . 6) concentrically enclosing a carrier body 4 and spaced from one another by layer insulations 5. According to the exemplary embodiment illustrated, an additional carrier body 4' in the form of an electric insulation, for example, enclosing the spire of conductor layers $L_j$ carries only two concentric suitably spaced conductor layers $L_j'$ (with J'=1 and 2) of external conductor arrangement 9. FIG. 5 shows another exemplary embodiment of the external conductor 9 having three conductor layers $L_j'$ (with j=1,2,3). As FIG. 4 shows, all conductor layers of the internal and external conductor arrangements have different wire angles $\alpha_j$ and $\alpha_j'$ with a stepwise transition between negative angles to positive angles, taking into account the different ways of counting the internal and external conductors. This rule, however, does not always need to be followed. A stepwise change in the angle can also occur in the opposite direction.

In a cable design with concentric forward and return conductors, as illustrated in FIGS. 3 and 4, the above-mentioned mathematical relation applies exactly for determining wire angle $\alpha_j$ for the forward conductor only in the event where the return conductor is sufficiently far away from the forward conductor, so that the magnetic field of the return conductor has dropped to a negligible value. The function of the forward and return conductors can, of course, be also reversed for this discussion. In general, however, it can be stated that in an a.c. cable according to this invention with concentric forward and return conductors, wire angle $\Delta\alpha_j$ always has the same polarity from layer $L_j$ to layer $L_{j+1}$. The layers are counted as was explained in connection with FIGS. 3 and 4. It should also be noted that the direction of winding of the conductors $L_1$ of layer $L_1$ of internal and external conductors have mostly the same polarity, i.e. $\alpha_{1i}$ and $\alpha_{1a}$ are either both positive or both negative.

The above-explained exemplary embodiments are based on the electric conductors of the a.c. cable according to the present invention being conductors with at least one conductor core made of HTSC material. The measures to be taken regarding the selection of special wire angles are particularly advantageous for conductors made of such materials; however, the discussions concerning these angles also apply to conductors made of conventional superconducting materials, such as NbTi or Nb$_3$Sn, which make cooling with liquid He necessary.

The measures according to the present invention can also be advantageously used with a.c. cables having normally conducting conductors, such as Cu or Cu alloys. An increase in a.c. losses due to a skin effect can then be avoided in conductors made of these materials with said measures.

What is claimed is:

1. An alternating current cable, comprising:
   at least one cable core, the at least one cable core including:
   a central carrier body; and
   at least three conductor layers, each conductor layer including a plurality of electric conductors which are arranged in a filament-like manner around the central carrier body at a predetermined wire angle,
   wherein the at least three conductor layers conduct an alternating current in one direction, wherein, the predetermined wire angles of the electric conductors in the conductor layers are selected so that the predetermined wire angles change stepwise between a first value of an innermost conductor layer of the at least three conductor layers and a second value of an outermost conductor layer of the at least three conductor layers, and wherein, the following relationships are substantially satisfied:

$$\frac{2\pi R}{l_{j+1}} - \frac{2\pi R}{l_j} = \tan\alpha_{j+1} - \tan\alpha_j = \frac{2\Delta R \sum_{k=1}^{j} \cos\alpha_k}{R \cdot (H_z/J)}$$

wherein $$H_z/J = \sum_{k=1}^{N} \sin\alpha_k,$$

and wherein $l_j$ is a lay length of the electric conductors in a corresponding conductor layer of the at least three conductor layers, $\alpha_j$ is the predetermined wire angle of the electric conductors in the corresponding conductor layer of the at least three conductor layers, $H_z$ is an axial field inside the at least one cable core, J is a current density in each conductor layer of the at least three conductor layers, R is a mean radius of a combination of all conductor layers of the at least three conductor layers, $\Delta R$ is a difference between the mean radii of adjacent conductor layers of the at least three conductor layers, and N is a number of conductor layers of the at least three conductor layers.

2. The alternating current cable according to claim 1, wherein the electric conductors include a superconducting material.

3. The alternating current cable according to claim 2, wherein the electric conductors include a high-$T_c$ superconducting material.

4. The alternating current cable according to claim 3, wherein the high-$T_c$ superconducting material includes at least one core in one of a silver and a silver alloy matrix.

5. The alternating current cable according to claim 1, wherein the electric conductors include a normally conducting material.

6. The alternating current cable according to claim 1, wherein the at least one cable core includes an inner forward conductor and an outer return conductor arranged in a concentric manner around the at least one cable core, and wherein at least one of the inner forward conductor and the outer return conductor includes the at least three conductor layers.

7. The alternating current cable according to claim 6, wherein the inner forward conductor includes the three conductor layers and the outer return conductor includes another two conductor layers, wherein a first change in the predetermined wire angles between the three layers of the inner forward conductor and a second change in the predetermined wire angles between the two layers of the outer return conductor have the same polarity.

8. The alternating current cable according to claim 6, wherein a winding direction of the electric conductors of the innermost conductor layer of the inner forward conductor and a winding direction of the electric conductors of the outermost conductor layer of the outer return conductor are the same.

9. The alternating current cable of claim 1, wherein the electric conductors have at least one of a strip and a wire shape.

10. The alternating current cable of claim 9, wherein a ratio of a width to a thickness of the strip-shaped conductors is between 10:1 and 50:1.

11. The alternating current cable of claim 1, further comprising:

a layer arranged between adjacent conductor layers.

12. The alternating current cable of claim 11, wherein the layer includes an insulating material.

13. The alternating current cable of claim 11, wherein the layer includes an electrically conducting material.

* * * * *